Patented June 8, 1943

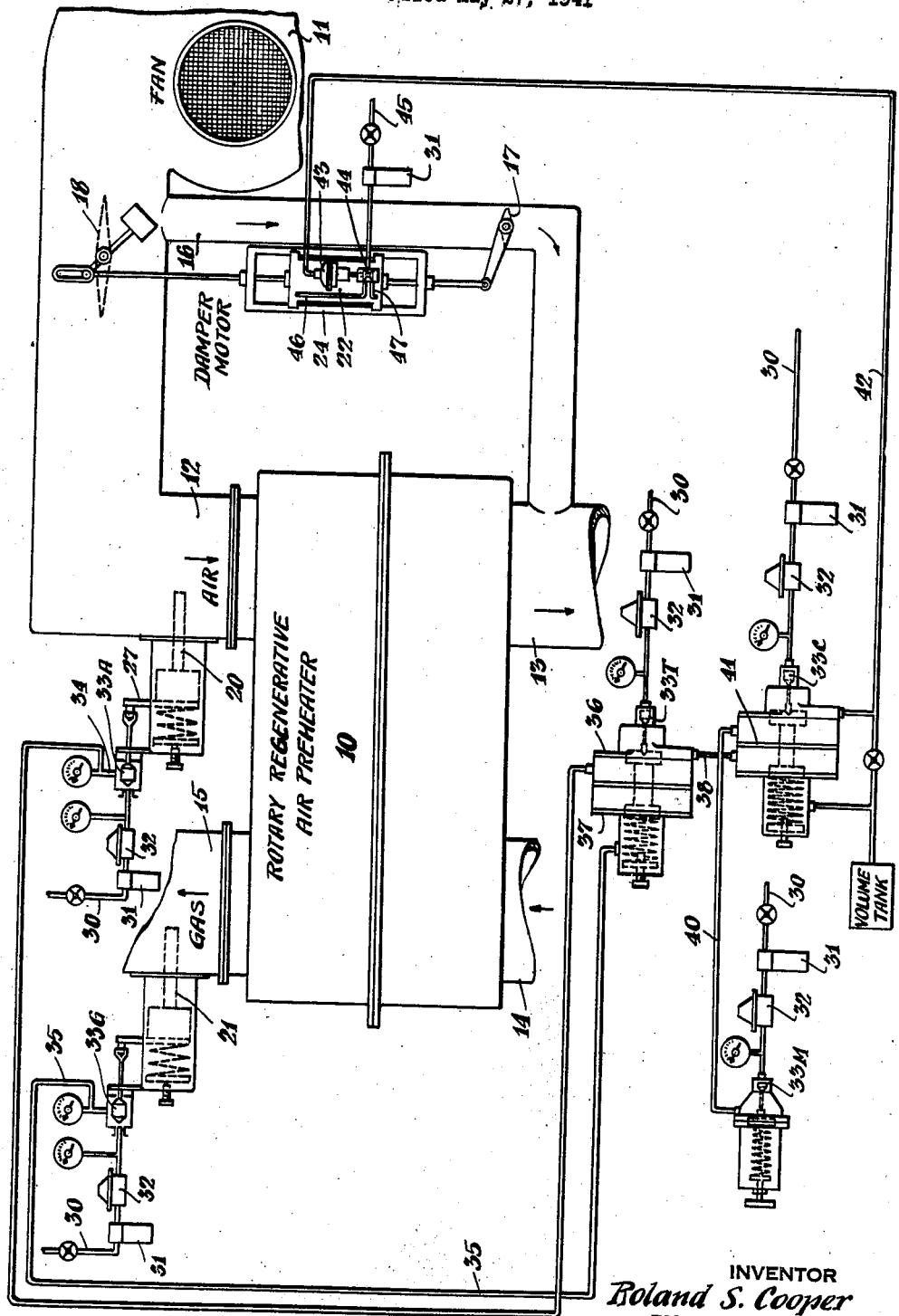

2,321,129

UNITED STATES PATENT OFFICE 2,321,129

AIR PREHEATER CONTROL

Roland S. Cooper, River Forest, Ill., assignor to The Air Preheater Corporation, New York, N. Y.

Application May 27, 1941, Serial No. 395,352

1 Claim. (Cl. 257—2)

The present invention relates to improvements in regenerative air preheaters and particularly to minimizing corrosion of the heat transfer plates in a regenerative preheater of the rotary type.

When air preheaters are operated under such conditions that the temperature of the metallic heat transfer plates is so low as to be at or below the dew point of the gases entering the preheater, moisture is condensed from the gases and causes corrosion of the plates. The present invention contemplates minimizing such corrosion by controlling the amount of air passing through the preheater with respect to the amount of heating gases so the preheater operates under such conditions that the mean temperature of the heat transfer plates is maintained above the dew point of the heating gases. A damper controlled air by-pass around the preheater is provided so more or less air may be by-passed to maintain the plate temperature above the dew point of the heating gases. This control is based upon the fact that the mean temperature of the heat transfer plate is a definite function of half the total of the temperature existing in the air inlet duct of the preheater and in the gas outlet duct thereof. Accordingly, by providing mechanism for measuring these two temperatures and adding them together the by-pass damper may be automatically adjusted to by-pass air when required so as to maintain a predetermined plate temperature.

In the drawing the single figure is a schematic view of an air preheater installation embodying the present invention.

In the drawing the numeral 10 designates a rotary regenerative air preheater. Air to be preheated is supplied to the preheater by the fan 11 through the inlet duct 12 and carried away from the preheater to the point of use through the outlet duct 13. Hot gases such as those discharged from a boiler enter the preheater through the gas inlet duct 14 and pass to the stack or other point of discharge through the gas outlet duct 15. The preheater is of the well known Ljungstrom type, such as is shown in Ljungstrom Patent 1,522,825, issued January 13, 1925, having a rotor provided with sector compartments carrying metallic heat transfer plates which are first heated by the gases entering at 14 and leaving at 15 and which are then turned into position to yield their heat to the air entering at 12 and leaving at 13. For the purpose of regulating the amount of cool air passing through the preheater so that the temperature of the heat transfer surface may be controlled for the purposes mentioned above, a by-pass duct 16 extends from the air inlet duct 12 to the air outlet duct 13 and has therein a damper 17. If desired, dampers 18 may also be provided in the inlet duct 12 or in the outlet duct 13 ahead of the by-pass and arranged so as to restrict flow through the air preheater and thus divert a greater quantity through the by-pass duct 16.

The dampers 17 and 18 are connected to be actuated by an air operated damper motor diagrammatically represented as consisting of a piston cylinder 22 which is stationary and a movable yoke 24 which is connected to the piston of the motor and also to the dampers 17, 18.

The temperature of the cool air entering the air preheater is measured by a thermostat 20 and the temperature of the gas leaving the preheater after having been partially cooled by imparting heat to the air is measured by the thermostat 21. These thermostats are the primary control elements and in accordance with the invention the by-pass damper 17 is to be operated in response to variations from a predetermined total temperature of the entering cool air and outgoing cooled gas so as to maintain the heat transfer plates at a temperature high enough to prevent condensation of moisture therein from the heating gases. Any suitable apparatus whether mechanical, electrical or otherwise actuated which in its operation would act to add together the temperatures in the air inlet duct 12 and gas outlet duct 15 and cause the damper 17 to open or close in response to fluctuations from a predetermined total would be suitable for carrying out the present invention.

For the purpose of providing a complete description of the invention one form of such apparatus, which is the "Hagan" pneumatic control apparatus, will be described hereinafter although it is to be understood that the invention is not to be considered as limited to employment of this apparatus. The thermostats 20 and 21 which are the primary control elements, are associated with other control elements actuated by compressed air and adapted to add the totals of the temperatures measured by these thermostats and eventually cause movement of the dampers 17 when a predetermined total temperature is departed from. Compressed air from a suitable source at constant pressure flows through a conduit 30 having an air filter 31 and pressure reducing valve 32 therein to a pilot valve 32A. The pilot valve 33A is connected to the movable element 27 of the thermostat 20 on the air side so that as temperature changes occur in duct 12 the pilot valve 33A is opened more or less thereby varying the air pressure communicated through a conduit 34 to a diaphragm 36 of a Hagan "totalizer." In like manner the movable element of the thermostat 21 on the gas side controls the air pressure communicated via a conduit 35 to act on another diaphragm 37 of the totalizer in the same sense that the air pressure in conduit 34 acts on the diaphragm 36. The diaphragms 36 and 37 are interconnected and accordingly the forces acting on the two of them are added together. The diaphragms are connected to and actuate a pilot valve 33T to regulate the air pressure in a conduit 38 in proportion to fluctuations in the total of the temperatures existing at the air inlet and gas outlet of the preheater.

The air pressure created in the conduit 38 to reflect the total of the temperatures in the air inlet 12 and gas outlet 15 is compared with a standard representing the predetermined temperature at which it is desired to maintain the heat transfer surface of the preheater. A handset regulating or pilot valve 33M may be set so that the pressure of air in the conduit 40 constitutes a standard representing the predetermined temperature at which it is desired to maintain the heat transfer surface. The air pressure in conduit 38 representing the actual existing total temperatures of the air entering and the gas leaving the preheater acts on one side of a diaphragm 41 and is opposed by the standard pressure in conduit 40 representing the temperature at which it is desired to maintain the heat transferring surface. The diaphragm 41 is connected to the pilot valve 33C which therefore responds to create a pressure variation in a line 42 in accordance with departures of the actual existing temperature total from a predetermined total temperature.

The pressure in line 42 acts against a spring on a diaphragm 43 connected to a valve 44 to admit air from a high pressure line 45 through pipes 46 or 47 to one side or the other of a piston in the cylinder 22 of the air motor that operates the damper 17. When the total of the temperatures existing in the air inlet duct 12 and gas outlet duct 15 falls below the predetermined temperature total the control apparatus produces a pressure in line 42 which causes the valve 44 to be positioned so that air from the pressure line 45 passes through the pipe 46 to the upper end of the piston cylinder 22 thereby moving yoke 23 downwardly causing operation of the air motor in a direction to partially open the damper 17. Consequently, part of the cool air previously passing through the preheater flows through the by-pass duct 16. The spring resisting the diaphragm 43 is so arranged as to tend to return valve 44 to a neutral position so as to stop the air motor when the damper 17 has opened proportionally to the pressure variation in line 42 caused by decrease in the temperature total. The amount of air passing through the preheater 10 from the inlet duct 12 is thus reduced and therefore absorbs less heat from the heat exchange plates. The temperature of these plates is thus maintained at a high enough value to prevent condensation. In other words when the temperature of entering air falls so low or its relation with respect to the temperature of the outlet gases is such that the air would cool the heat transfer plates to a temperature such that on entering the gas side of the preheater condensation will take place, part of the cool air is by-passed and the plates retain a part of the heat imparted to them by the gases which previously they had yielded to the larger volume of air. When the total temperature measured by the thermostats 20 and 21 exceeds a predetermined value, the resultant action of the control system lowers the pressure in the conduit 42 and the spring associated with diaphragm 43 causes the valve 44 to be moved to a position in which air from pressure line 45 is supplied through the pipe 47 to the lower end of the piston cylinder 22 thereby producing movement of the damper 17 in the closing direction.

What I claim is:

In a regenerative air preheater having inlet and outlet ducts for a heating gas, similar ducts for air to be heated, and a rotor carrying heat transfer members for absorbing heat from the gases and imparting it to the air; a conduit leading from the air inlet duct to the air outlet duct and so arranged as to form an air by-pass around the preheater; damper means operable to regulate the amount of air flowing through said by-pass conduit; means for measuring the air temperature in the inlet duct therefor and the gas temperature in the gas outlet duct; means for obtaining the total of said temperatures; and means associated with said totalizing means and responsive to fluctuation of said temperature total from a predetermined total for operating said damper.

ROLAND S. COOPER.